Figure 1:
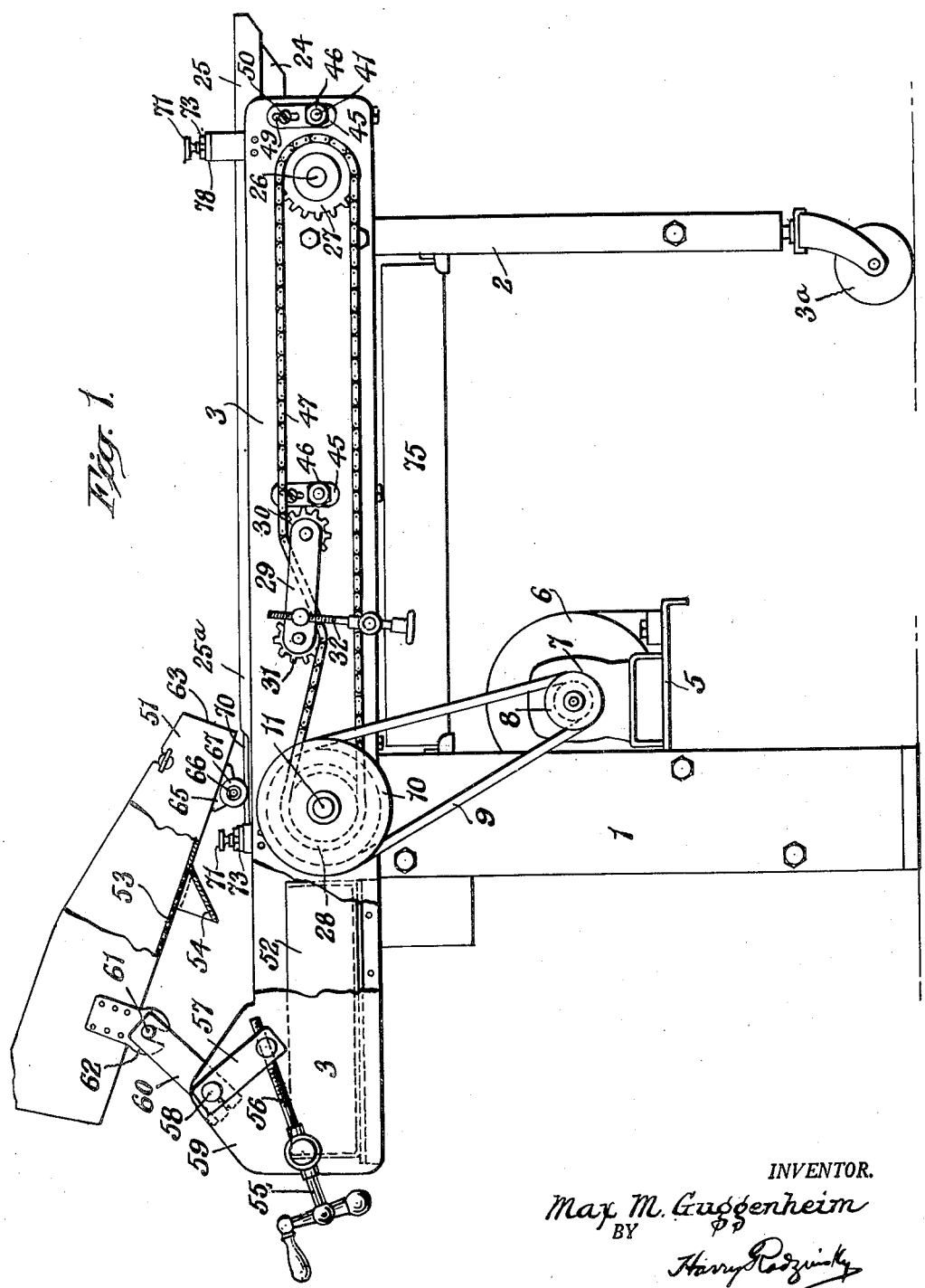

Dec. 19, 1950     M. M. GUGGENHEIM     2,534,667
CONVEYING DEVICE

Filed Aug. 26, 1949     4 Sheets-Sheet 1

INVENTOR.
Max M. Guggenheim
BY Harry Radzinsky
ATTORNEY

Dec. 19, 1950   M. M. GUGGENHEIM   2,534,667
CONVEYING DEVICE
Filed Aug. 26, 1949   4 Sheets-Sheet 2
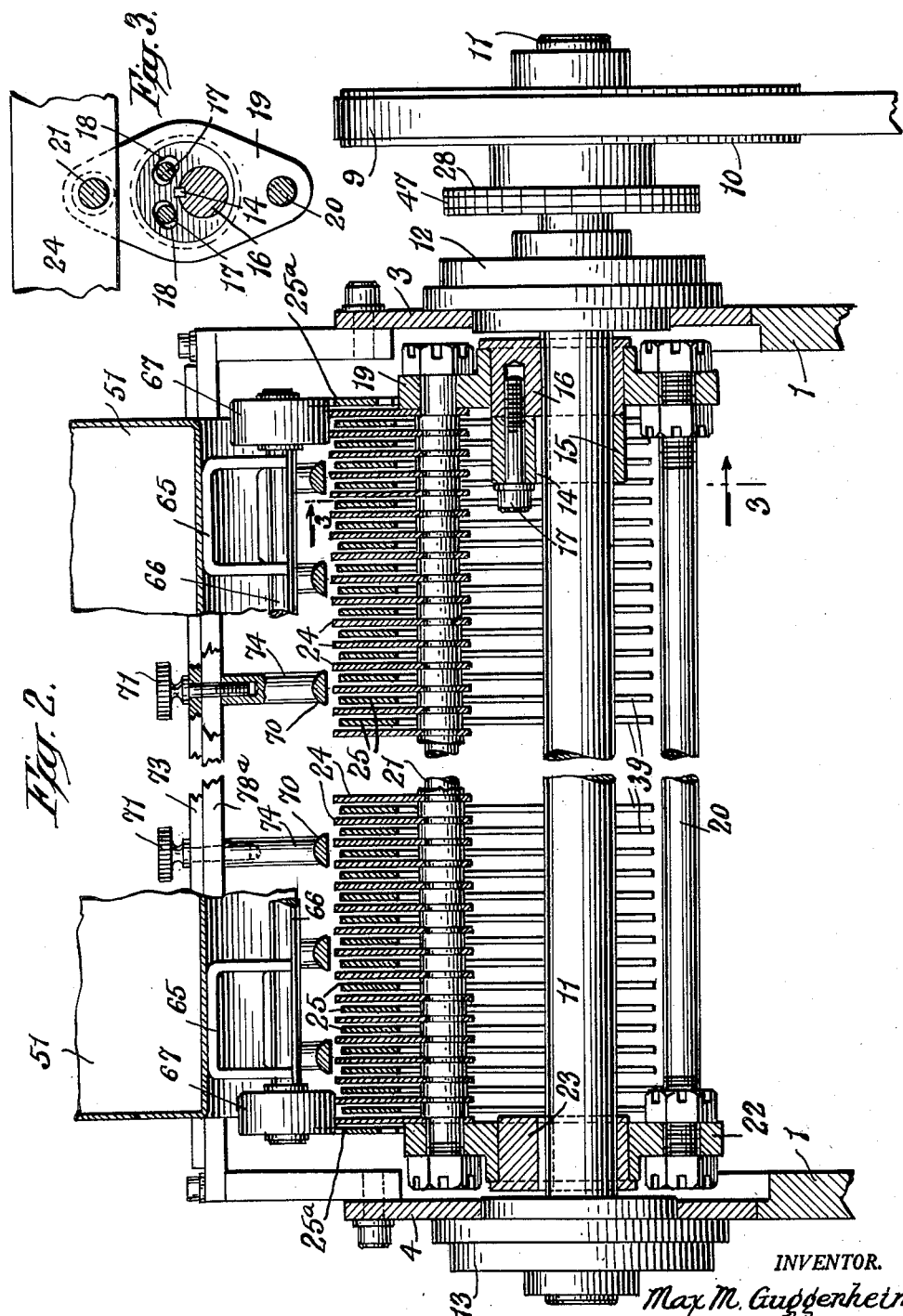
INVENTOR.
Max M. Guggenheim
BY
Harry Radzinsky
ATTORNEY

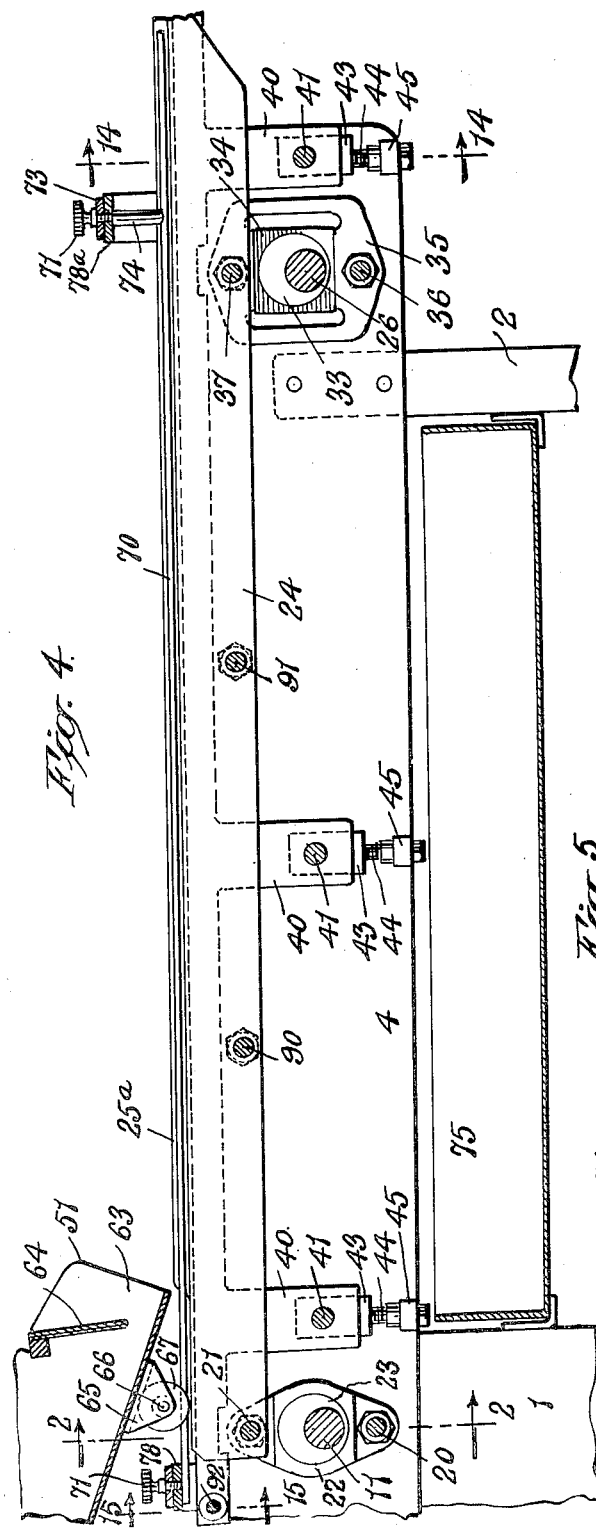

Dec. 19, 1950   M. M. GUGGENHEIM   2,534,667
CONVEYING DEVICE
Filed Aug. 26, 1949   4 Sheets-Sheet 4
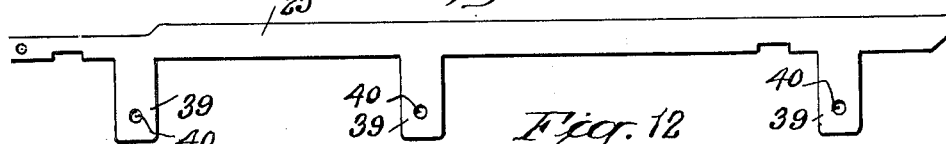
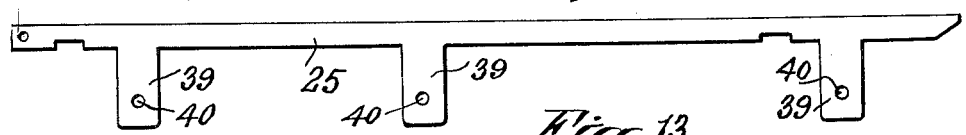
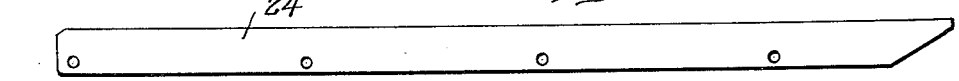
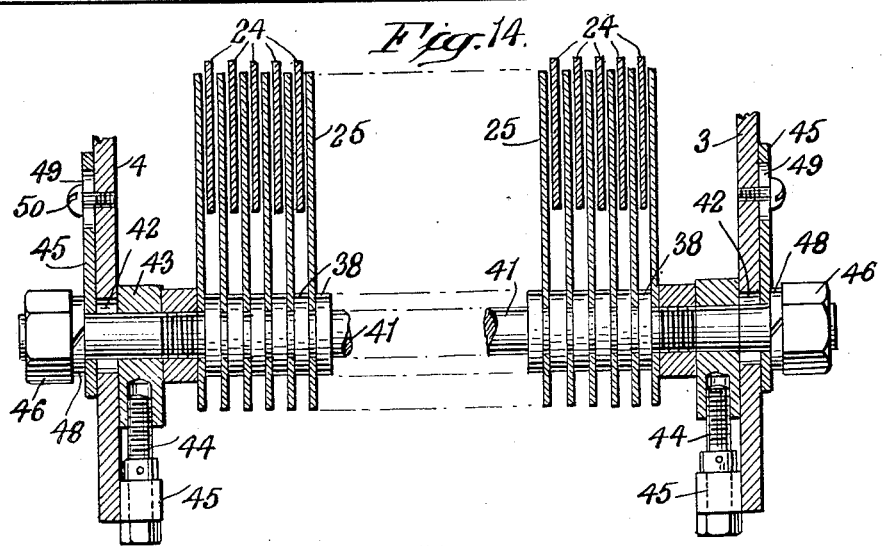
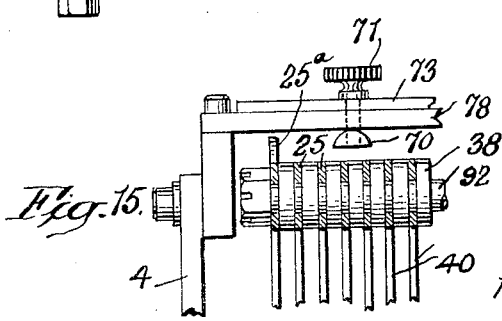
INVENTOR.
Max M. Guggenheim
BY
Harry Radzinsky
ATTORNEY Patented Dec. 19, 1950

2,534,667

UNITED STATES PATENT OFFICE 2,534,667

CONVEYING DEVICE

Max M. Guggenheim, New York, N. Y., assignor to National Equipment Corporation, New York, N. Y., a corporation of New York Application August 26, 1949, Serial No. 112,496

5 Claims. (Cl. 198—53)

This invention relates to moving or transporting devices for small articles, such as candies, candy fillers and many other articles which require separation and feeding, especially in lines or rows, for treatment or operations upon them by machines, for packaging, or for other purposes.

One of the objects of the invention is to provide a simple device whereby articles are placed in a hopper, are caused to be delivered therefrom by vibratory movements imparted to the hopper, and are deposited on a grill composed of stationary and movable elements, the latter elements being oscillated with a rising, forward and then descending and backward movement, whereby said elements, upon their rising and forward movements will pick up the articles from the stationary elements on which they are resting and carry them forward progressively until they reach the point of egress from the conveyor. The invention further contemplates the provision of means for utilizing the rising movements of said movable feeding elements as cam means for imparting the vibratory movements to the hopper, and includes other means resulting in a simple and effective feed for small articles which will operate speedily and efficiently for the purposes required and to be hereinafter described in detail.

In the accompanying drawings, wherein an illustrative embodiment of the invention is disclosed, Fig. 1 is a side elevation of a feeding device, constructed in accordance with the invention; Fig. 2 is a sectional view through the machine, the same being taken on the line 2—2 of Fig. 4, looking in the direction of the arrows: Fig. 3 is a sectional view taken on the line 3—3 of Fig. 2, looking in the direction of the arrows; Fig. 4 is a vertical sectional view through the machine, the view being taken longitudinally of the machine; Fig. 5 is a view of one of the cross members which supports the spacing bars; Fig. 6 is a top plan view of the structure of Fig. 5, with the upper plate removed and the pins which support the spacing bars shown in section; Fig. 7 is a top plan view of the spacing bars and supports therefor; Fig. 8 is a detail view of the rear spacing bar support; Fig. 9 is a detail view, with parts in section, of a portion of one of the forward spacing bars and the supporting means therefor; Fig. 10 shows the mounting of the spacing bars; Fig. 11 is a side view of one of the stationary end bars; Fig. 12 is a side view of one of the stationary central bars; Fig. 13 is a side view of one of the movable or oscillated lifter bars; Fig. 14 is a sectional view taken on the line 14—14 of Fig. 4, looking in the direction of the arrows, and Fig. 15 is a sectional view on the line 15—15 of Fig. 4, looking in the direction of the arrows.

Referring to the drawings, and particularly to Fig. 1 thereof, the machine frame includes the upright supporting frame including the posts or standards 1, which are suitably braced and reinforced, and the front legs 2 which are also suitably braced and are shown as being supported by the casters 3. The legs 2 and standards 1 are connected at the top by the longitudinally-extending horizontal side frame members shown at 3 and 4. Supported by the standards 1 is a platform or motor base 5 which supports an electric motor 6, driving reducing gearing 7 which drives a pulley 8 around which the belt 9 extends. Said belt 9 extends around a pulley 10 secured on a shaft 11 extending across the machine and rotative in the bearings 12 and 13 in the side members 3 and 4 of the frame of the machine. Keyed upon the shaft 11, as shown at 14, is an eccentric collar 15 which is adjustably attached to an eccentric 16 also surrounding the shaft 11, by means of the screws 17 which are threaded into the eccentric 16 and pass through slots 18 (Fig. 3) thereby permitting rotative adjustment of the eccentric 16 on the shaft 11 as required.

As shaft 11 is rotated the eccentric 16 rotates within a rocking member or actuator 19 which is connected by cross rods 20 and 21 to a similar rocking member or actuator 22 at the opposite side of the machine. The actuator 22 is moved with an oscillating or rocking motion by means of the eccentric 23, similar to that shown at 16, and keyed to the shaft 11.

Mounted on the cross rod 21, which extends between the upper ends of the actuators 19 and 23, is a plurality or gang of spaced lifter bars 24, which are raised and moved forwardly by the raising or lifting movement imposed on the actuators 19 and 22 by the rotation of the eccentrics 16 and 23 within said actuators. This group or gang of lifter bars 24 tends to lift or raise articles, such as candies, resting above them on stationary supports or bars 25, and carry them forward and then deposit them in the forward position down on the stationary bars 25 in preparation for the next lifting and forward movement of the lifter bars.

The oscillating movement applied to bars 24 as above described, is applied by the eccentrics 16 and 23 on shaft 11 at the entrance end of the machine, as well as by similar eccentrics located at the outlet end of the machine. At the latter end of the machine is located a rotative shaft 26, which carries a sprocket 27 over which extends a chain 47 that passes about a sprocket 28 secured on the shaft 11. A tension device 29, carrying two idler sprockets 30 and 31, and adjustable by means of the threaded rod 32, is located between the sprockets 27 and 28 to take up any undue slack in the chain.

The eccentrics at the outlet end of the machine, one of which is shown at 33 in Fig. 4, are each operative within a block 34 mounted to have a slight sliding movement in an actuator member of the shape shown at 35 in Fig. 4. This sliding movement affords a slight play which prevents binding during the oscillations imparted by the eccentrics, and especially at the outlet end of the machine. The two actuators 35 at the outlet end of the machine are connected by cross rods 36 and 37, the upper cross rod 37 of this pair receiving the gang of spaced lifter bars 24. The arrangement described is such that when shaft 11 is rotated, it will also rotate shaft 26 through the chain drive consisting of the chain 47 and sprockets 27 and 28, and as these shafts 11 and 26 are rotated, the eccentrics 16 and 23 on shaft 11 and the eccentrics 33 on shaft 26, will intermittently elevate and move forward the lifter bars 24, and then descend and move backward, while maintaining said bars 24 substantially horizontal. The gang of lifter bars 24 is also held together by cross rods 90 and 91 seen in Fig. 4. It will of course be understood that the bars 24 will be held in suitably spaced relation on the several rods 90, 91, 37 and 21 on which they are mounted.

The stationary bars 25, between which the lifter bars 24 are raised and lowered, are maintained in spaced relation by spacers 38 (Fig. 14) on a plurality of cross rods 41 and 92 which extends through apertures 40 formed in the integral lug portions 39 which extend downwardly from the bars 25. One of the cross rods 41 is shown in Fig. 14 wherein it will be noted that the same is adjustable to enable the top edge of the gang of stationary bars to be set at the desired level or at an inclination. To facilitate this adjustment of the several rods 41, the same extends through an enlarged opening or slot 42 (Fig. 14) in each of the side members 3 and 4, and at each end, the rod 41 carries an adjusting block 43 threadably engaged by a set screw 44 rotative in lug 45 on each of the side members 3 and 4. On the outer face of each of the side members 3 and 4 is a plate 45 through which the ends of the rod 41 extend and receive the nuts 46 and lock washers 48. Plate 45 is provided at the upper end with an adjustment slot 49 through which screw 50 extends to threadably enter the side member 3 or 4. This arrangement is such as to hold the stationary bars at the proper height and level or inclination and in properly spaced relation to enable the movable or lifter bars to operate between them in a manner to be hereafter described. As will be noted in Figs. 11 and 12, some of the stationary bars, or the two indicated at 25a, are of greater height than others. These are end bars, and are those adjacent to the opposite side frame members 3 and 4 and are of the greater height and rise above the other bars, including the movable bars, to serve to prevent the candies or other articles from falling sidewisely from the machine.

In addition to lifting and moving forward the candies or other articles handled by the machine, the lifter bars 24 impart a cam movement to the hopper 51 from which the candies are fed. The hopper 51 consists of an inclined tray into which the candies or other articles are deposited to be thereafter delivered therefrom and fed along the bars 24 and 25 in rows or lines preparatory to entry into a coating machine or for delivery onto a belt for inspection, or perhaps delivered into cartons or packages, depending upon the objects being handled and fed. The bottom of the hopper may be, at least in part, of perforated or foraminous material, as indicated at 53 in Fig. 4 and below this portion of the bottom is a deflector plate 54 which acts to deflect particles of the articles being handled, or broken or crushed articles that are of a size to sift through the apertured bottom and fall down into a catch receptacle 52 supported below the hopper 51, as shown in Fig. 1.

The hopper 51 is adjustably tilted or inclined at a desired angle by means of a rotative spindle 55 having a threaded portion 56 threadable through an element at the end portion of an arm 57 secured at the end of a shaft 58 rockingly mounted in ear portions 59 arising from the side frame members 3 and 4. Also secured on the shaft 58 is a pair of arms 60 between the upper ends of which is mounted a rod 61. The side walls of the hopper 51 each have a yoke 62 and the two yokes fit over the rod 61. It will be apparent that by reason of this arrangement, rotative movement of the adjusting spindle 55 will enable the rear end of the hopper 51 to be raised or lowered accordingly and the hopper thus set at any desired angle for best gravitational descent of its contents out of its lower or forward end 63. Near its forward or open end 63, the hopper is provided with a pivoted gate 64 to level off and restrict the flow of articles out of the hopper.

Near its forward or open end 63, the hopper is provided on the bottom with a pair of brackets 65 carrying a shaft 66, at the ends of which are mounted rollers 67 normally resting on the top edges of some of the stationary bars 25 when the lifter bars are in their lowered position. When the eccentrics raise the lifter bars 25, these bars rising above the stationary bars will act as cams upon the rollers 67 and raise the same, thus raising and lowering the forward or open end of the hopper and imparting a rocking or jogging motion to the hopper to thus cause its contents to be shaken down toward and out of the open end 63 and fall down upon the grill composed of the stationary and lifter bars. The articles which thus descend upon the bars 24 and 25 and come to rest upon the top edges of the stationary bars, when the lifter bars 24 are in their lowered position with their top edges slightly below those of the stationary bars, remain there until the next raising movement of the lifter bars 24 by which said articles are raised, carried forward for a short distance and then lowered to again come to rest upon the stationary bars, having been advanced some distance from the point at which they were picked up by the raising movements of the lifter bars. Repeated raising and advancing movements of the lifter bars will thus repeatedly advance the articles in a direction away from the hopper until said articles have been moved off the bars 24 and 25 and received upon a belt, or collected into a receptacle, or fed into the entrance of another machine for the performance of some subsequent operation upon the articles.

In moving the articles along the bars 24 and 25 it is desirable that the articles be retained in rows or lines and for this reason guide bars, shown in detail in Figs. 5 to 9 inclusive are employed. These guide rods may consist, and in the form shown are of lengthy, half-round rods 70 secured under a slotted cross bar 78 at the entrance end of the machine by set screws 71 extended through suitably spaced apertures 72 provided in a top plate 73 which overlies the slot in the cross bar 78 and through which the set screws project to threadably engage the rods 70. A similar arrangement is provided at the outlet end of the machine except that the cross bar 78a there employed is elevated to enable the candies or other articles to readily pass beneath it. The screws 71 there employed thread into upward extensions or stems 74 formed on and arising from the tops of the guide rods 70 as clearly seen in Fig. 9. This and other adjusting means is possible to guide the candies or other articles in rows or lines along the top of the machine toward its outlet end.

From the foregoing, the operation of the improved feeding means will be readily understood. Candies or other articles to be fed are placed in the hopper 51, which, because of its manner of placement on the machine may be filled if desired at a position remote from the machine, and then set in place thereon, with the yokes 62 fitted over the rod 61 and the rollers resting upon the bars 24 or 25 according to the position in which the lifter bars are located when the hopper is placed in position. When the machine is set in operation, rotation of the shafts 11 and 26 will cause the respective eccentrics on these shafts to raise the lifter bars 24, move them forward and then descend to a level below the upper edges of the stationary bars, and then move backward to their initial position. In the drawings, the lifter bars 24 are shown in their elevated position with their upper edges above those of the stationary bars 25. This movement of the lifter bars will raise and lower the front portion of the hopper and cause the contents of the hopper to be vibrated or jogged down toward and out of the forward open end of the hopper to fall therefrom out on the bars 24 and 25. On each upward and forward movement of the lifter bars 24, the candies or other articles will be raised from the stationary bars 25, carried forward for a short distance by the lifter bars 24 and then brought to rest down on the stationary bars 25 while the lifter bars then descend below the stationary bars, move rearwardly and then arise on the next lifting and carrying cycle.

The repeated lifting and forward movement of the lifter bars results in moving the candies or other articles forward step by step and in lines, guided by the adjustable bars 70, so that the articles reach the end of the machine for delivery therefrom in alignment to the element or device intended to receive them. Since the several bars 24 and 25 which co-operate to support and transport the candies or other articles form an open grid or grill between them, any particles or loose materials adhering to the articles being fed will not be retained on the bars but may freely fall through the spaces between them and be collected in a removable receptacle 75 supported by the frame below the bars.

The conveying by the mechanism described is rapid, is unifrom and undamaging to the articles fed and the goods are handled in a sanitary fashion.

Having described one embodiment of the invention, it is obvious that the same is not to be restricted thereto, but is broad enough to cover all structures coming within the scope of the annexed claims.

What I claim is:

1. In a conveying device, a supporting surface composed of a plurality of spaced-apart substantially parallel bars, a hopper supported in an inclined position above said bars, rollers on the hopper resting upon said bars, a plurality of connected lifter members located in the spaces between the bars and normally positioned with their upper surfaces below the upper surfaces of the bars, means for imparting an eccentric movement to the lifter members to cause the same to be raised to bring their upper surfaces above the upper surfaces of the parallel bars, then moved forwardly, then downwardly and then back to their initial lowered position, said movements of the lifter members causing raising and lowering movement of the rollers and the hopper mounted thereon and causing lifting and advancing movement of articles supported upon the bars.

2. In a conveying device, a grill-like support composed of spaced, fixed bars, movable bars in the spaces between the fixed bars, means for moving the movable bars upwardly to elevate their tops above the fixed bars, then forwardly, then downwardly and backwardly to cause said movable bars to raise and move forwardly articles which were resting upon the fixed bars, and a hopper having supporting elements normally resting on the fixed bars and located in position to be raised and lowered by the up-and-down movements of the movable bars.

3. In a conveying device, a frame, a plurality of spaced-apart, longitudinally-extending, parallel fixed bars mounted in said frame and forming a grill-like support for a plurality of articles to be conveyed, a plurality of lifter bars coupled together and located in the spaces between the fixed bars, means connected to the lifter bars for elevating the same to bring their upper surfaces above the upper surfaces of the fixed bars whereby said movable bars will raise articles then resting upon the fixed bars, said means also moving the movable bars forwardly to cause them to advance the lifted articles, a pivotally-mounted hopper, and means on said hopper normally resting on the fixed bars and against which the movable bars are operative on their raising movements to raise said means and cause tilting of the hopper on its pivot.

4. In a conveying device, a grill-like support composed of a plurality of spaced, fixed bars, movable bars located in the spaces between the fixed bars, a hopper pivoted at one end above the bars and having its other end resting upon the same, means for moving the movable bars upwardly to elevate their tops above the fixed bars and to raise one end of the hopper, said means also moving the movable bars forwardly, then downwardly and backwardly, the upward, forward and downward movements of the movable bars causing articles resting upon the fixed bars to be raised and moved forward and then brought down to rest upon the fixed bars.

5. In a conveying device, a supporting surface composed of a plurality of spaced-apart and substantially parallel fixed bars, a hopper supported in an inclined position above said bars, rollers at one end of the hopper resting on the bars, each roller being of a width to cause it to rest upon a plurality of the bars, a plurality of elongated connected lifter members located in the spaces between the bars and normally positioned with their upper surfaces below the upper surfaces of the bars, means for imparting an eccentric movement to the lifter members to cause the same to be raised to bring their upper surfaces above the upper surfaces of the parallel bars, then moved forwardly, then downwardly and then back to their initial lowered position, said raising movements of the lifter members causing some of them to engage the rollers between the bars on which the rollers are supported and to lift and then lower said rollers.

MAX M. GUGGENHEIM.

REFERENCES CITED

The following references are of record in the file of this patent:

UNITED STATES PATENTS

| Number | Name | Date |
|---|---|---|
| 1,000,828 | Lorillard | Aug. 15, 1911 |
| 1,189,064 | Coulston | June 27, 1916 |
| 2,466,936 | Dowie | Apr. 12, 1949 |

FOREIGN PATENTS

| Number | Country | Date |
|---|---|---|
| 149,284 | Switzerland | Nov. 2, 1931 |
| 543,180 | Germany | Feb. 1, 1932 |